US006287417B1

(12) United States Patent
Bhat

(10) Patent No.: US 6,287,417 B1
(45) Date of Patent: Sep. 11, 2001

(54) RECOVERY OF SURFACTANT FROM PAPERMAKING PROCESS

(75) Inventor: Dinesh M. Bhat, Neenah, WI (US)

(73) Assignee: Fort James Corporation, Deerfield, IL (US)

( * ) Notice: Subject to any disclaimer, the term of this patent is extended or adjusted under 35 U.S.C. 154(b) by 0 days.

(21) Appl. No.: 07/807,750

(22) Filed: Dec. 17, 1991

Related U.S. Application Data

(63) Continuation of application No. 07/598,995, filed on Oct. 17, 1990, now abandoned.

(51) Int. Cl.[7] .............................. D21F 1/00; D21F 1/66

(52) U.S. Cl. .............................. 162/101; 162/190

(58) Field of Search .............................. 162/101, 190

(56) References Cited

U.S. PATENT DOCUMENTS

| | | | |
|---|---|---|---|
| 3,716,449 * | 2/1973 | Gatward et al. | 162/101 |
| 3,798,122 * | 3/1974 | Appel | 162/101 |
| 3,871,952 | 3/1975 | Robertson | 162/101 |
| 3,937,273 | 2/1976 | Radvan et al. | 162/212 |
| 3,938,782 | 2/1976 | Robertson | 259/4 |
| 3,947,315 | 3/1976 | Smith | 162/101 |
| 4,057,495 | 11/1977 | Kinoshita et al. . | |
| 4,443,297 | 4/1984 | Cheshire et al. | 162/101 |
| 4,443,299 | 4/1984 | Cheshire et al. | 162/101 |
| 4,488,932 | 12/1984 | Eber et al. | 162/9 |
| 4,498,956 | 2/1985 | Cheshire et al. | 162/101 |
| 4,543,156 | 9/1985 | Cheshire et al. | 162/101 |
| 4,686,006 | 8/1987 | Cheshire et al. | 162/101 |
| 4,764,253 | 8/1988 | Cheshire et al. | 162/101 |
| 4,869,782 | 9/1989 | Nelson et al. | 162/9 |

OTHER PUBLICATIONS

"Sheet Formation & Printability," by B. Radvan et al, presented at the 14th EUCEPA Conference in Oct., 1971.

"Wet–Laid, Long Fiber Formers," by A.P.J. Gatward, published in *Paper Technology*, vol. 13, No. 4, dated Aug., 1972.

"The Structure and Properties of Paper Formed by a Foaming Process," by M. K. Smith et al, *Tappi*, vol. 57, No. 1, Jan. 1974.

"Long–Fibre Developments in U.K. & Europe," by A.P.J. Gatward, published in Paper Technology, vol. 14, No. 5, Oct., 1973.

"New Developments in the Radfoam Process," by R. W. Tringham, published in *Paper Technology*, Oct., 1974, vol. 15, No. 5, pp. 288–294.

Brunner, C.A. and Stephan, D.G., "Foam Fractionation," Ind. Eng. Chem 57(5): 40 (1965).

Ng, K.S. and Temoin, P., "Design Considerations of Foam Separation Process for Detoxification of Kraft Effluents," B.C. Research.

Ng, K.S., Mueller, J.C., Gutierrez, L.A. and Walden, C.C., "Detoxification of Kraft Pulp Mill Effluents by Foam Separation Pilot Plant Studies," Pulp & Paper Canada 80, No. 11: 87–92 (Nov. 1979).

Rose, J.L. and Sebald, J.F., "Treatment of Waste Waters by Foam Fractionation," Tappi 51, No. 7: 314–321 (Jul. 1968).

Haas, P.A. and Johnson, H.F., "Foam Columns for Countercurrent Surface—Liquid Extraction of Surface–Active Solutes," A.I.Ch.E. Journal, 11 No. 2: 319–324 (Mar., 1965).

* cited by examiner

*Primary Examiner*—Peter Chin

(74) *Attorney, Agent, or Firm*—Finnegan, Henderson, Farabow, Garrett & Dunner, LLP

(57) ABSTRACT

A method and apparatus for recovery of surfactant from a foamable liquid aqueous solution thereof wherein foamable liquid containing surfactant is sparged with air or gas forming foam enriched in surfactant and residual liquid depleted in surfactant, foam enriched in surfactant is separated from residual liquid and resolved into foamable liquid enriched in surfactant by separation of gas or air therefrom.

46 Claims, 2 Drawing Sheets

AIR
AIR 55
56
63
68
60
60
62
61
65

60
68
70
70

70
68
66
60
70
65
62

RECOVERY OF SURFACTANT FROM PAPERMAKING PROCESS

This application is a continuation of application Ser. No. 07/598,995 filed Oct. 17, 1990, now abandoned.

Replacing water with foam provides many advantages in papermaking. However, in addition to substantial problems involved in merely making that substitution, environmental problems involved with use of large amounts of surfactants have become increasingly severe as environmental regulations become more stringent. The combination of both sets of problems have done much to impede large scale commercial implementation of most, if not all, of the papermaking processes replacing water with foam which have been suggested over the last quarter century. The present invention largely obviates the environmental problems previously associated with foam substitution as it provides an economical, practical means of concentrating the surfactant in streams recovered from the process. In many cases, the surfactant, the stream bearing it or both, may be purified to such an extent that they may be reused, thus moving us many steps closer to the common dream of the papermaker and the ecologist—a closed process. Thus, broadly this invention relates to a method for recovery of surfactant from an aqueous admixture. In one of its more specific aspects, this invention relates to recovery of reusable surfactant from discarded foamed liquid in a foam forming papermaking process and reuse of the recovered surfactant in the process. In still another of its more specific aspects, this invention relates to a wet web forming process wherein a foamed fiber furnish is prepared by mixing a water slurry of fibers with a foamed liquid comprising water, air, and surfactant, a fibrous web is formed on a moving felt or wire on a papermaking machine with recovery of foamed liquid therefrom, part of the foamed liquid is recycled to make up further amounts of furnish and part of the foamed liquid is processed for recovery of surfactant for reuse in the process. Water from which the surfactant is recovered by the method of this invention may be so processed to the extent necessary to meet environmental purity requirements for discharge into lakes and streams, as well as for reuse or recycle into the papermaking process. The process may be used also in conjunction with other papermaking processes employing foamable admixture of surfactants, for example, a foam assisted dewatering process.

BACKGROUND OF THE INVENTION

The manufacture of high grade paper products such as towels and tissue, especially facial tissue and bathroom tissue, by forming a dispersion of wood fibers in a foamed aqueous carrier and depositing the resulting foam-fiber furnish on a forming wire of a papermaking machine is known in the art. A disclosure of pertinent prior art relating to foam forming processes is included in U.S. Pat. No. 4,443,297 incorporated herein by reference. In such processes, all of the foamable liquid recovered from the forming wire is recycled in the process. In a coassigned copending patent application of John H. Dwiggins and Dinesh M. Bhat, filed concurrently herewith, an improved process for foam forming is disclosed in which the papermaking fibers are dispersed in water prior to addition to foamed liquid with the result that excess liquid must be discarded from the system as a foamed liquid containing surfactants.

SUMMARY OF THE INVENTION

The invention is directed to a method and apparatus for the recovery of surfactant, e.g., an alpha olefin sulfonate or a peg-6 lauramide, from a foamed or foamable aqueous admixture containing surfactant, usually of the order of 150 to 1000 parts per million (ppm) surfactant by weight.

In accordance with this invention, foamed liquid is separated into reusable surfactant admixture and a purified aqueous stream by a multi-stage process including drainage, aeration, and foam resolution. First, foamed liquid is drained creating a more-dense fraction of foamable liquid impoverished in surfactant and a less-dense fraction of foam enriched in surfactant. Subsequently, these fractions are separated from each other and the dense fraction from the drainage stage, optionally combined with foamable liquid from other sources in the papermaking operation, is aerated with air bubbles, preferably of a uniform size range of from about 1 to 5 mm, to form a stable, free draining foam enriched in surfactant from which a more-dense phase of surfactant-depleted liquid is drained, separated from the foam, and upon which other aeration stages may be imposed if desired or necessary. The resulting foams may be broken or resolved to remove air therefrom, and the resulting surfactant-enriched foamed liquid or foamable liquid stream recycled to the process. Alternatively, in some cases, foam may be recycled without being resolved.

The surfactant content of a foamed aqueous liquid containing of the order of 500 ppm or more surfactant may be reduced to non-foamable water containing about 10 parts per million or less, and as low as about 3 ppm, by repeating the aeration, drainage and separation steps in sequential stages. Foaming of the water containing surfactant usually ceases at about 3 to 10 ppm. In many cases, it will be advantageous to recycle surfactant-depleted water to other operations in the web forming process such as, for example, pulping, repulping, showers, washers, and other applications for which water of this quality is suitable.

In some applications wherein surfactant is to be recovered primarily from foamable liquid rather than from a foamed liquid, the initial drainage step may be omitted. The drainage step may occur in the foamable liquid return lines without requiring a separate drainage apparatus.

DETAILED DESCRIPTION OF A PREFERRED EMBODIMENT

Figure 1:
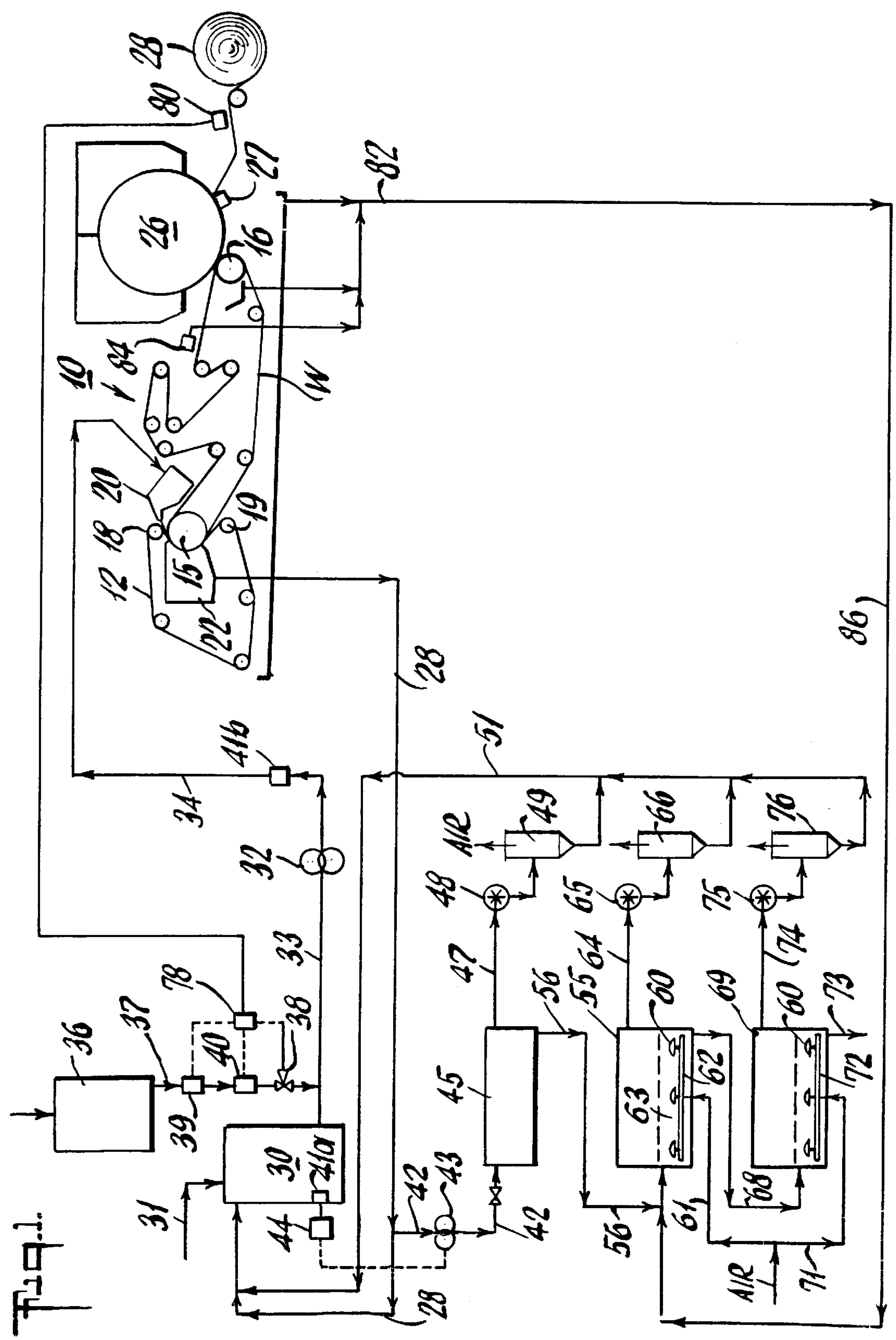
FIG. 1 of the drawings is a diagrammatic representation of a papermaking machine with auxiliary equipment for the preparation of a foamed aqueous furnish from low consistency pulp illustrating one application of the process of this invention.

With reference to FIG. 1, an illustrative process and apparatus for foam forming a fibrous web, and the recovery of surfactant from excess foam in accordance with this invention are illustrated diagrammatically. In this particular embodiment, a papermaking machine 10 is illustrated; this machine is known in the art as a crescent former, and corresponds to that described in U.S. Pat. No. 3,326,745, incorporated herein by reference. The web forming end or wet end of the papermaking machine includes a liquid permeable forming felt or fabric 11 and a pressing wire or screen 12 of the type used in the art for wet forming of nonwoven webs. Forming felt 11 is also referred to hereinafter as a moving foraminous support means. Forming felt 11 is suitably constructed of nylon or polyester woven mesh with a fine synthetic batt attached to form a thick, liquid permeable fabric which is supported in a conventional manner on rolls including breast roll 15 and a couch roll or pressing roll, such as a suction pressure roll 16. Pressing wire 12 is similarly supported on rolls including rolls 18 and 19 which are so positioned relative to breast roll 15 as to cause the pressing wire 12 to converge on the forming felt 11 at the cylindrical breast roll 15 at an acute angle relative to felt 11. The felt 11 and wire 12 move in the same direction at the same speed and in the direction of rotation of breast roll 15.

In this machine, wire 12 and forming felt 11 converge at the upper surface of forming roll 15 to form a wedge shaped space or nip into which a jet of a foamed fiber furnish is directed from a pressurized headbox 20. Wire 12 is so tensioned that as it passes over the felt 11 on the surface of breast roll 15, the foamed liquid-fiber dispersion is pressed between wire 12 and felt 11 forcing liquid through wire 12 into saveall 22 where it is collected as foamed liquid having an air content in the range of 55 to 75 percent by volume for reuse in the process. The wet web W formed in the process is carried by felt 11 to pressing roll 16 where it is transferred to the drum 26 of a Yankee dryer. Liquid is pressed from the wet web by pressing roll 16 as the wet web is transferred to drum 26 of the dryer where it is dried and creped by creping blade 27. The finished web is collected on take-up roll 28. It will be evident that some of the surfactant necessary to form the foamed aqueous liquid used in the process normally remains in the web.

In this particular embodiment of a wet web foam forming process, foamed liquid is first formed as described in U.S. Pat. No. 4,443,299. To initiate start-up, water from a suitable source, not illustrated, is added to the silo 30 through line 31 with sufficient surfactant to produce the desired foamed liquid. For example, an aqueous solution of a suitable anionic surfactant, such as an alpha olefin sulfonate available from Witco Corp., New York, under the tradename Witconate AOS may be used to produce a satisfactory aqueous foam at a preferred concentration in the range of from about 150 ppm to about 350 ppm by weight. A number of surfactants suitable as a water additive for purposes of the present invention are available on the market, being generally classified a nonionic, anionic, cationic, or amphoteric surfactants. The surfactant concentration required usually will be in the range of 150 to 1000 ppm by weight. A preferred nonionic surfactant is a peg-6 lauramide marketed under the tradename Mazamide L-5AC by Mazer Chemical Co., Chicago.

Selection of a surfactant is dependent upon chemical characteristics of such other additives as may be commonly used in the manufacture of fibrous webs. U.S. Pat. Nos. 3,716,449 and 3,871,952 disclose specific nonionic, anionic, and cationic surfactants that have been found suitable for forming fibrous webs from dispersions of fibers in foam. U.S. Pat. No. 4,056,456 discloses additional surfactants, including some classified as amphoteric surfactants, which are suitable for use in the practice of the present invention. The disclosures of these patents are included by reference in the present application for their teachings of surfactants materials. It is to be understood that there are a number of other surfactant materials available which are capable of modifying the interfacial tension between water and gas or air to form semi-stable aqueous carrier media and which are suitable for recovery of surfactant from aqueous foams containing such surface active agents by the process of this invention. Those skilled in the art appreciate that appropriate blends of surfactants may be in some cases be desirable.

A preferred method of generating the aqueous foam as the carrier of the fibers in the furnish is that disclosed in U.S. Pat. No. 4,443,299. As a specific example of start-up, foamed liquid carrier is initially generated by driving the forming felt 11 and wire 12 at a speed of about 2500 feet per minute (fpm) with the tension of the pressing wire 12 adjusted to range of from about 20 pli (pounds per linear inch) to about 60 pli, suitably about 30 pli. Positive displacement fan pump 32 is energized to pump an aqueous surfactant solution, containing e.g. 300 ppm of an anionic surfactant, from silo 30 through lines 33 and 34 to headbox 20, from which a jet of foamable liquid is directed to the nip formed at the juncture of the forming felt 11 and wire 12. The pressure and flow rate of the foamable liquid at the headbox is regulated to achieve a jet velocity of from about 90% to about 150% of the speed of the forming felt 11 and wire 12, both during foam formation and subsequent web formation. Typically, the speed of the jet is about 110% of the speed of the felt and wire. Forming felt and wire speeds in the range of from about 1000 feet per minute (fpm) to about 7000 fpm or more may be employed in the formation of web W.

As the foamable liquid impinges on the forming felt 11, it is distributed over the surface of the felt, and the pressure created as the outer wire 12 moves onto the inner felt 11, combined with the force of liquid jetted from headbox 20 on the outer wire 12, causes the foamable liquid to flow through interstices of the outer wire 12 into the saveall 22. The forces produced by closure of the wire 12 onto forming felt 11 and the linear speed and the force of impingement of the liquid jet from headbox 20 onto the wire produce combined centrifugal, compressive and shear forces on the liquid passing through headbox 20 and wire 12. These forces are sufficient to entrain air traveling with the wire as well as air in its interstices, and thus to generate the desired foamed liquid containing for example 60 to 70 volume percent air.

The foamed liquid collected in saveall 22 and at pressing roll 16 is returned to foam silo 30 by way of conduit 28. The foamable liquid and recycled foamed liquid are pumped again, in continuous cyclic manner, from tank 30 by fan pump 32 to headbox 20 for passage through wire 12 and return to silo 30 via conduit 28. Typically, over an operating period of about 5 to 30 cycles, the air content of the foamable liquid is increased from almost nil to a preferred value for steady operation in the range of about 60 to about 70 percent air by volume with a maximum bubble size, for example, in a range from about 20 microns to about 200 microns, i.e., of a size less than the lengths of the fibers which are used in the furnish. Optimum relationships of bubble dimensions to fiber dimensions are dealt with in the referenced U.S. Pat. Nos. 3,716,449 and 3,871,952 and are preferred in the process of the present invention. When the air content of the foamed liquid reaches the desired steady operating level, e.g., 60 to 70 volume percent, paper forming is initiated by adding fiber to the foamed liquid to form the foamed fiber furnish. During the web forming operation, foamed liquid is continuously generated or regenerated on the wire of the papermaking machine in the manner just described.

In accordance with this invention, foamed liquid collected from the foam-fiber furnish in saveall 22 is withdrawn through line 28 to foam silo 30. A water slurry of pulp containing on the order of 0.5 to 7 weight percent fiber, preferably in the range of from about 2.5 to about 4.5 percent fiber, is drawn from a machine chest 36 through line 37 and flow control valve 38 to line 33 and added to the foamed liquid from silo 30 in the amount necessary to form the foam-fiber furnish of the desired consistency in the range of from about 0.1 to about 3 weight percent fiber, preferably in the range of 0.3 to 1.2 percent fiber, for the production of the fibrous web by papermaking machine 10. The foam-fiber furnish is delivered by a positive displacement fan pump 32 to a pressurized headbox 20 through conduit 34 as disclosed in coassigned copending patent application filed concurrently herewith in the names of J. H. Dwiggins and D. M. Bhat. The rate of pulp feed in line 37 to the fan pump is controlled by valve 38 governed by controller 78 based on signals from basis weight meter 80, consistency meter 39 and flow meter 40, all of conventional design, to produce webs of the desired basis weight at the production speed of the forming felt 11 of papermaking machine 10.

The pulp slurry supplied to the system from machine chest 36 introduces water into the system at a greater rate than that at which water is removed from the system by the wet web. In accordance with this invention, the resulting excess foamed liquid recovered from the saveall 20 is supplied to a liquid separation unit 45 through line 42. In the illustrated embodiment, pump 43, responsive to controller 44, maintains a substantially constant inventory of foam of the desired air content in silo 30 in response to signals from pressure sensor 41*a* at the base of silo 30 and from density meter 41*b* in line 34.

Liquid separation unit 45 may comprise a container into which foamed liquid is introduced from line 42. In the separation unit 45, a heavier, liquid rich phase drains and then is separated from a lighter, liquid lean foam phase. The separated foam phase is discharged from the upper part of the container through line 47 to a foam resolution unit 48 which separates air from foamed liquid.

As used herein, the term "resolving" means the removal of a substantial portion, or all, of the gaseous component from the foam as distinguished from "drainage" in which a substantial portion of the liquid is removed from the foam without removing a substantial portion of the gaseous component. Thus, a "resolved foam" may contain no gas or it may still contain relatively large amounts of gas. In foam resolving or resolution, it is usually intended to rupture bubbles contained in the foam so that the gas contained therein may be separated from the admixture of gas and liquid, while in drainage, it is usually intended that bubbles are only minimally disturbed at most so that surfactant-depleted liquid may be removed therefrom. By "separation" or "separating", I mean physically moving or transporting the foam or lighter portions of it away from the liquid or dense phase, or alternatively, of course, physically moving or transporting the liquid or dense phase away so that liquid does not drain into the dense phase from the foam. The term "admixture" as used herein is intended to include all aggregations of more than one component whether multi phase or single phase, a solution, dispersion, colloid, suspension, foam, emulsion, froth, physical mixture, or other structure. As used herein "fibrous web forming process" should be understood broadly to include forming of paper or nonwovens, as well as auxiliary processes such as, for example, pulping, repulping, showering, washing, deinking, fiber recovery, padding, additive impregnation, coating, drying, dewatering and the like.

Drainage accomplished in liquid separation unit 45 results in recovery of a surfactant-enriched foam phase which is separated or recovered through line 47 from the foamed liquid supplied to the liquid separation unit 42. Similarly, a surfactant-depleted liquid phase is separated from the surfactant-enriched foam phase and recovered through line 56. It has been found, for example, that the liquid leaving the liquid separation unit 45 through line 56 has a surfactant concentration equivalent to about half that of the foamed liquid entering the liquid separation unit through line 42 while the drained foam has a concentration of over about 100 ppm by weight, preferably over about 300 ppm, more preferably in the range of about 400 to about 700 ppm by weight.

Foam leaving liquid separation unit 45 through line 47 is resolved down to an air content of 50 to 80% air by volume in foam resolution unit 48, air being separated from the resulting surfactant-enriched foam which is then returned to silo 30 through conduit 51. It has been found that a straight blade radial blower operates satisfactorily as a foam resolver. Alternatively, so-called "foam breaking devices" such as those described in K. S. Ng et al, Pulp and Paper Canada, Vol. 78, No. 2, February 1977, pp 37–42, may be used. In the process of this invention, foamed liquids containing any amount of air up to about 80% by volume may be advantageously returned to silo 30.

Liquid from liquid separation unit 45, optionally combined with liquid in line 86 from other sources, such as suction pressure roll 16, couch pit 82, or vacuum box 84, is introduced into surfactant recovery unit 55 through line 56. Aerators 60 disposed within the lower portion of surfactant recovery unit 55 may be of any construction which is capable of generating a stable, free draining foam from the foamable liquid admixture of interest including pressurized air aerators, turbine aerators, Denver cells, jet aerators, porous diffusers and the like. These units can serve fairly well when used with admixtures containing relatively small amounts of surfactants such as below about 30 ppm by weight, but as concentrations increase, these aerators, particularly jet aerators, become less and less practical. At high concentrations of surfactant, such as above about 100 ppm, problems associated with these units, particularly conventional jet aerators, can become almost, if not completely, prohibitive. The presence of cellulosic fibers can contribute to problems with many of these units. However, I have now found that major operational advantages are obtained by use of non-clogging aerators of the type illustrated in FIGS. 2, 3, and 4 hereof which significantly reduce residence time and hence overall volume of the separation units while also achieving high surfactant recovery efficiency by generating stable, free draining foams from admixtures containing substantial amounts of fiber along with extremely high concentrations of surfactant. These advantages flow from the use of bubbles of a critically controlled, narrow size distribution in the range of about 1 mm to about 5 mm. It has been found that if bubbles having an excessively wide non-uniform distribution of bubble sizes are used, excessive coalescence results which is detrimental to effective surfactant separation. Small bubbles (on the order of 0.1 mm or less) tend to rise very slowly through the surfactant-containing admixture and tend to become entrained in the dense phase discharge carrying surfactant along and thereby reducing separation efficiency. Larger bubbles (on the order of 10 mm or more) are less effective because they rupture easily, have low interfacial area relative to their volume, and form a less stable foam. Thus, large bubbles are relatively ineffective both for entraining surfactant and in forming a foam which has a high capacity for surfactant. Small bubbles are undesirable for the foam phase as drainage of liquid is slowed, thereby causing marked increase in residence time or volume required for effecting a desired degree of separation. Thus, if the bubbles used are too small, not only will excessive amounts of surfactant remain in the dense phase removed by drainage, but also the surfactant in the foam phase may not be easily concentrated to such a level that it is suitable for reuse in the papermaking process. By creating bubbles of a relatively uniform size distribution in the range of about 1 mm to about 5 mm, it is possible to achieve reductions of well over an order of magnitude in the residence time or volume required to effect a desired degree of separation as compared to aerators producing either non-uniform bubbles or bubbles significantly larger or smaller than those of the desired size range. It is possible to empirically verify that the size distribution of the bubbles generated is sufficiently close to that desired if the dense phase leaving the surfactant recovery unit is substantially free of a significant amount of air bubbles entrained in the stream and at the same time, the foam phase formed above the dense phase is sufficiently stable for a foam residence time of at least several seconds, preferably of at least about 10 seconds, more preferably of at least 30 seconds, to allow drainage of relatively purified liquid back into the dense phase. Such a foam is termed a "stable, free draining" foam. Further, lower energy is required for use of aerators of the type illustrated in FIGS. 2, 3, and 4 as compared with jet aeration, dissolved air flotation, or turbine aeration. In the embodiment illustrated, a plurality of units are shown as a preferred embodiment rather than one larger tank. Air from a suitable source is supplied to the aerators 60 from air supply line 62 and manifold 62. As air is bubbled through the foamable liquid 63 in surfactant recovery unit (SRU) 55, stable, free draining foam containing recovered surfactant is generated which drains and accumulates in the free space above the liquid 63 and after drainage is discharged through line 64 to foam resolving unit 65 of the type described hereinabove (i.e. foam resolver 48). The present process differs from usual so-called foam fractionation waste water treatment processes such as those low surfactant concentration processes described in Rose et al, TAPPI Vol. 57, No. 7, p. 314, in which drainage is said to be undesirable and steps to avoid it are employed, see page 317. Rather, in this process, two usable streams can be obtained by purifying both the aqueous phase and the surfactant by a process employing and promoting drainage from a stable free draining foam. It is extremely advantageous to allow drainage to continue until the concentration of surfactant in the foam is at least about the concentration of surfactant in the foam fiber furnish in the headbox.

The relative volumes of air per volume of surfactant supplied to surfactant recovery unit 55 to achieve desired extent of recovery of surfactant is best determined by trial. As a general rule an air to liquid ratio by volume of about 5:1 to 20:1, preferably from about 6:1 to 12:1, is satisfactory for each surfactant recovery unit in the line.

As used throughout this specification, the term "air" is to be understood to comprise all gases having substantially more than 50% by volume of nitrogen content, which includes atmospheric air or gases derived from atmospheric air, whether oxygen depleted as a combustion exhaust gas, or enriched in other gases, such as carbon dioxide, carbon monoxide, oxides of nitrogen or other contaminants.

Resolved foam recovered from foam resolution unit 65 is returned to the silo 30 through lines 51. Air is separated from the foamed liquid from foam resolver 65 in separator 66 which may take the form of an open tank.

It is preferable to employ a plurality of surfactant recovery units in series relative to the flow of liquid therethrough to reduce the surfactant concentration to a sufficiently low level to permit discharge of the excess water as waste water or for reuse in the papermaking process and at the same time to minimize the space required for the SRU. By means of the processing steps of this invention, the surfactant concentration may be reduced to a value of the order of 3 to 5 ppm which is usually suitable for other applications in papermaking as well as being considered environmentally acceptable in waste water discharge.

To this end, liquid from surfactant recovery unit 55 which is partially depleted in surfactant content is drawn off through line 68 and introduced into second stage surfactant recovery unit 69 which may be identical in construction with unit 55. Non-clogging aerators 60 in unit 69 are supplied with air or gas through line 71 and manifold 72. Waste water depleted in surfactant may be discharged from the system through line 73 or alternatively treated along with other plant waste waters. Foam enriched in surfactant is drawn off through line 74 to foam resolver 75. Liquid containing recovered surfactant is discharged from foam resolver 75 through air separator 76 into line 51 and returned to silo 30.

Figure 2:
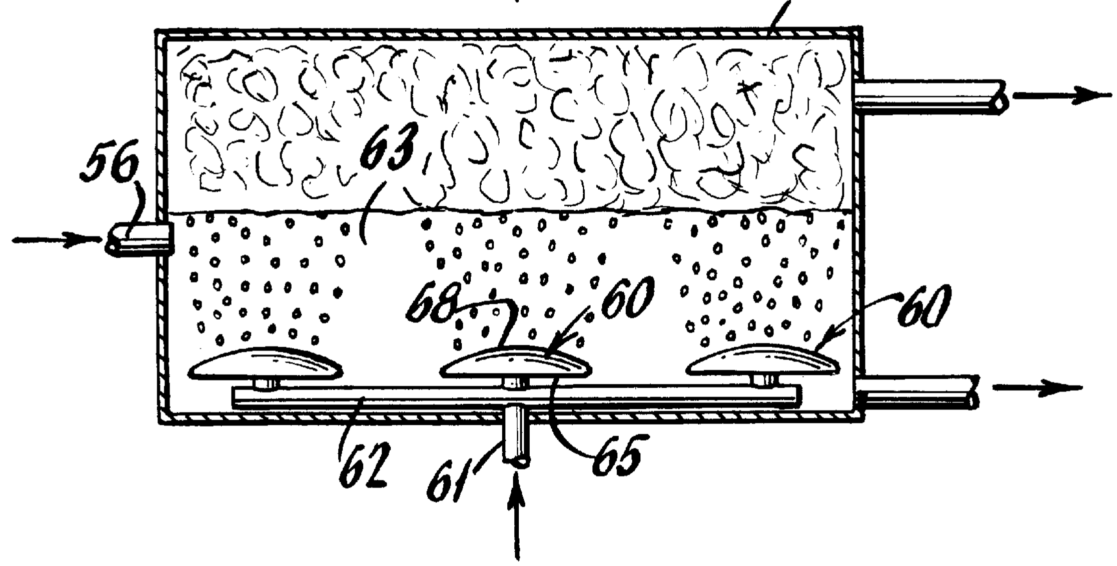
FIG. 2 is a diagrammatic elevational view, partly in vertical cross section, illustrating one preferred form of apparatus useful in carrying out the process of this invention.
Figure 3:
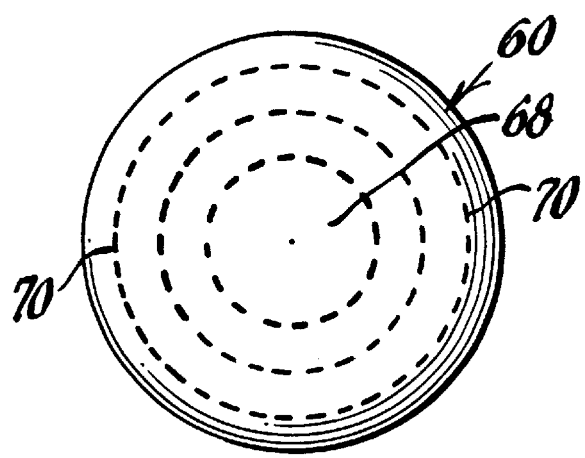
FIG. 3 is a plan view of a non-clogging sparger element of the apparatus of FIG. 2.
Figure 4:
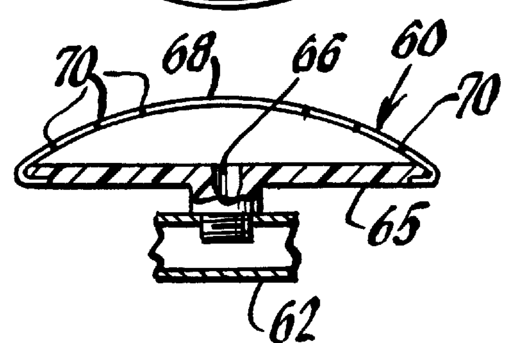
FIG. 4 is an elevational cross-sectional view of one of the non-clogging spargers of FIGS. 2 and 3.

With reference to FIGS. 2 to 4 of the drawings, a preferred form of an aerator 60 is illustrated. The particular aerator consists of a flat or upward facing convex dish 65 suitably formed of plastic and having a central tubular passageway 66 through which air from manifold 62 may flow freely. The upper surface of the dish is covered by a highly elastic diaphragm 68 provided with multiple uniform appropriately sized perforations 70 which in use produce uniform bubbles in the desired size range. The center of diaphragm 68 is free of perforations, thus when air pressure is applied through passageway 66, the diaphragm 68 lifts and stretches as illustrated in FIG. 2, opening the multiple perforations and allowing air to escape into liquid 63 with the formation of appropriately sized bubbles. The bubbles form foam enriched in surfactant which collects in the space above liquid 68 and is discharged from the vessel 65 through line 64. Aerators of this type are sold by Roediger, Inc. Pittsburgh, Pa., and are marketed under the tradename ROEFLEX Diaphragm Air Diffusers.

When air pressure is removed, diaphragm 68 retracts and seals perforations 70 against dish 65 while the air supply is sealed by retraction of the imperforate center of diaphragm 68 against tubular passageway 66. The use of this aerator obviates the usual requirement for stringent filtration of the air supplied to the aerator.

As illustrated in FIG. 1, surfactant recovery units may be advantageously employed in series. In the embodiment illustrated, surfactant recovery unit 69 is a duplicate of surfactant recovery unit 55. Any number of such units may be employed, preferably in series but also possibly in parallel, or both, as required for the desired extent of recovery of surfactant or purification of waste water from the process. For operational flexibility and reliability, several lines in parallel are preferred, each line comprising multiple surfactant recovery units in series.

As a specific example, excess foamed liquid from the web forming system discarded through line 42 and containing 280 ppm Witconate AOS will contain about 155 ppm by weight after drainage in unit 45 while the surfactant concentration in the foam removed through line 47 will be about 600 ppm. After combining with foamable liquid from line 86 containing about 60 ppm by weight of surfactant, the concentration in line 87 fed into SRU 55 is about 87 ppm by weight. The surfactant concentration in the liquid drawn from surfactant recovery unit 55 through line 68 will be about 57 ppm. The surfactant concentration in the foam leaving surfactant recovery unit 55 through line 64 is also about 600 ppm. A feed flow rate through line 56 of about 100 liters per minute (1/m) per square meter of unit floor area and an air flow rate of about 600 standard liters per minute per square meter of floor area is sufficient for this separation. In each case, the air content of the foam is about 99 percent by volume. The surfactant content of the liquid leaving surfactant recovery unit 55 through line 68 is reduced to about 32 ppm in surfactant recovery unit 69. The foam from surfactant recovery unit 69 which is drawn through line 74 to the foam resolver 75 also contains about 600 ppm surfactant by weight. The surfactant concentration of the dense phase from surfactant recovery unit 69 may be reduced to 5 ppm or less in one additional successive surfactant recovery unit, not illustrated. The surfactant concentration in the foam from each of the several surfactant recovery units is substantially constant at about 600 ppm.

Foam resolvers, per se, are known in the art. A preferred foam resolver for use in the process of this invention is a radial blower of the type marketed by Chicago Blower Corporation.

While the present invention has been described with respect to its application to a so-called crescent type papermaking machine utilizing a foam-fiber furnish, it is to be understood that its application is not limited to any specific type of wet forming papermaking machine employing a foamed fiber furnish, nor to any specific type of papermaking process employing foam.

As my invention, I claim:

1. A method of separating a stream of foamable aqueous admixture recovered from a fibrous web forming process into a surfactant-enriched stream and a surfactant depleted stream, comprising:

forming a stable-free-draining foam from said foamable aqueous admixture by passing a plurality of air bubbles therethrough, wherein substantially all of said bubbles are between about 0.1 and about 10 mm in diameter and said free-draining foam is sufficiently stable to allow a foam residence time of several seconds;

draining surfactant-depleted liquid which is substantially free of entrained bubbles from said stable foam in the substantial absence of coalescence in said foam, thereby forming a surfactant-enriched foam and a surfactant-depleted underflow;

separating the surfactant-enriched foam from the surfactant-depleted liquid forming a surfactant-enriched stream and a surfactant-depleted stream; and returning said surfactant-enriched stream to said fibrous web forming process in the form of a stream separate from said surfactant depleted stream and having a concentration of surfactant exceeding that of said foamable aqueous admixture.

2. The method of claim 1 wherein, said stable free draining foam is sufficiently stable to allow a foam residence time of at least 10 seconds without substantial coalescence and wherein, prior to returning the surfactant-enriched stream to the fibrous web forming process, air is separated from the surfactant-enriched foam by rupturing bubbles contained therein, thereby forming a resolved surfactant-enriched foam and wherein said bubbles are predominately between about 1 mm in diameter and about 5 mm.

3. The method of claim 2 wherein, in said fibrous web forming process, a foamable aqueous admixture having a surfactant concentration of at least about 30 ppm by weight is present in a headbox, wherein said plurality of bubbles predominantly between about 1 to about 5 mm in diameter is generated by passing air through a flexible perforated diaphragm, and wherein drainage from said stable free draining foam is allowed to continue until the concentration of surfactant in the resulting resolved surfactant-enriched foam is at least substantially equivalent to the concentration of surfactant in the foamable liquid admixture in said headbox.

4. The method of claim 1 wherein said foamable aqueous admixture comprises at least about 30 ppm by weight of surfactant, from about 1 percent to about 97 percent of a liquid aqueous phase by volume, and from about 3 percent to about 99 percent of air distributed through said liquid aqueous phase.

5. The method of claim 1 wherein at least 50% by volume of said air bubbles are between about 1 mm and 5 mm in size.

6. The method of claim 1 wherein at least 50% by number of said air bubbles are between about 1 mm and about 5 mm in size.

7. The method of claim 1 wherein the concentration of the surfactant in the surfactant-enriched stream exceeds about 100 ppm by weight.

8. The method of claim 1 comprising the additional steps of:

a) forming a second stable-free-draining foam from said surfactant-depleted stream by passing bubbles of air therethrough, said bubbles of air being predominantly between about 1 and about 5 mm in diameter;

b) draining a second surfactant-depleted liquid from said second stable-free-draining foam; thereby forming a second surfactant-enriched foam;

c) separating said second surfactant-enriched foam from said second surfactant-depleted liquid forming a second surfactant-enriched stream;

d) returning said second surfactant-enriched stream to said fibrous web forming process in the form of a stream having a concentration of surfactant exceeding that of said foamable aqueous admixture; and e) returning water contained in said second surfactant-depleted liquid to said fibrous web forming process in the form of a stream having a concentration of surfactant less than that of said foamable aqueous admixture.

9. The method of claim 1 comprising the additional steps of:

a) subjecting the surfactant-depleted liquid to at least one additional surfactant separation step, each surfactant separation step comprising the substeps of:

i) forming an additional stable free draining foam from said surfactant-depleted liquid produced in the preceding step by passing air bubbles therethrough, said air bubbles being predominantly between about 1 and about 5 mm in diameter;

ii) draining an additional surfactant-depleted liquid from said additional stable-free-draining foam produced in (i); thereby forming an additional surfactant-enriched foam;

iii) separating the surfactant-enriched foam produced in (ii) from the surfactant-depleted liquid formed in (ii);

iv) returning the surfactant in said surfactant-enriched foam to said fibrous-web-forming process in the form of a stream having a concentration greater than that of said foamable aqueous admixture;

b) subjecting the surfactant-depleted liquid to sufficient additional surfactant separation steps to reduce the concentration of surfactant in the surfactant-depleted liquid from substep (iii) of the last surfactant separation step to a level at which it is no longer foamable; and c) returning the additional surfactant-depleted liquid from substep (ii) of the last surfactant separation step to the process.

10. The method of claim 1 comprising the additional steps of:

a) subjecting the surfactant-depleted liquid to at least one additional surfactant separation step, each surfactant separation step comprising the substeps of:

i) forming an additional stable free draining foam from said surfactant-depleted liquid produced in the preceding step by passing air bubbles therethrough, said air bubbles being predominantly from about 1 to about 5 mm in diameter;

ii) draining an additional surfactant-depleted liquid from said additional stable foam produced in (i); thereby forming an additional surfactant-enriched foam;

iii) separating air from the surfactant-depleted liquid produced in (ii);

iv) returning the surfactant in said surfactant-enriched foam to said industrial process;

b) subjecting the surfactant-depleted liquid to sufficient additional surfactant separation steps to reduce the concentration of surfactant in the surfactant-depleted liquid from substep (iii) of the last surfactant separation step to a level at which it is no longer foamable; and c) discharging the additional surfactant-depleted liquid from substep (ii) of the last surfactant separation step to the environment in the form of an ecologically acceptable aqueous discharge stream comprising less than 5 ppm by weight of said surfactant.

11. The method of claim 1 wherein the surfactant is an alpha olefin sulfonate having at least about 10 carbon atoms.

12. A method of separating a stream of foamable aqueous admixture discharged from a fibrous web forming process into at least one stream of surfactant-enriched foam and at least one stream of non-foamable water surfactant admixture, comprising the steps of:

forming a stable-free-draining foam from said stream of foamable aqueous admixture by passing air bubbles therethrough, wherein substantially all of said bubbles are between about 0.1 and about 10 mm in diameter and said free-draining foam is sufficiently stable to allow a foam residence time of several seconds;

draining surfactant-depleted aqueous liquid which is substantially free of entrained bubbles from said foam in the substantial absence of coalescence in said foam, thereby forming a surfactant-enriched foam;

separating the surfactant-enriched foam from the surfactant-depleted liquid thereby forming a surfactant-enriched overflow from the surfactant-enriched foam and a purified aqueous underflow from the surfactant-depleted aqueous liquid;

returning the said purified aqueous underflow to said fibrous web forming process in the form of a stream separate from said surfactant-enriched overflow.

13. The method of claim 12 wherein the surfactant in the surfactant-enriched foam produced in each aqueous purification step is returned to the fibrous web forming process in a stream separate from said surfactant-enriched overflow and having a concentration substantially exceeding that of said stream of foamable aqueous admixture and wherein said bubbles are predominately between about 1 mm in diameter and about 5 mm.

14. The method of claim 13 wherein prior to returning the surfactant to the process, air is separated from the surfactant-enriched foam by rupturing bubbles contained therein, thereby forming a resolved surfactant-enriched foam.

15. The method of claim 13 wherein said fibrous web forming process is a forming process in which a foamable liquid having a surfactant concentration of at least about 30 ppm by weight is present in a headbox and wherein drainage is allowed to continue until the concentration of surfactant in the resolved surfactant-enriched foam is at least substantially equivalent to the concentration of surfactant in the foamable liquid in said headbox.

16. The method of claim 12 wherein said foamable liquid admixture comprises at least about 30 ppm by weight of surfactant, from about 1 percent to about 97 percent of a liquid aqueous phase by volume, and from about 3 percent to about 99 percent of air distributed through said liquid aqueous phase and wherein said bubbles are predominately between about 1 mm in diameter and about 5 mm.

17. The method of claim 12 wherein at least 50% by volume of said air bubbles are between about 1 mm and 5 mm in size.

18. The method of claim 12 wherein at least 50% by number of said air bubbles are between about 1 mm and about 5 mm in size.

19. The method of claim 12 wherein the concentration of the surfactant in the surfactant-enriched foam exceeds about 100 ppm by weight.

20. The method of claim 12 comprising the additional steps of:

a) forming a second stable foam from said surfactant-depleted liquid by passing bubbles of air therethrough;

b) draining a second surfactant-depleted liquid from said second foam; thereby forming a second surfactant-enriched foam;

c) separating said second surfactant-enriched foam from said second surfactant-depleted liquid;

d) returning second surfactant-enriched foam to said process; and e) returning said second surfactant-depleted liquid to said process.

21. The method of claim 12 comprising the additional steps of:

a) subjecting the surfactant-depleted liquid to at least one additional surfactant separation step, each surfactant separation step comprising the substeps of:

i) forming an additional stable-free-draining foam from said surfactant-depleted liquid produced in the preceding step by passing air bubbles therethrough;

ii) draining an additional surfactant-depleted liquid from said additional stable foam produced in (i) by drainage; thereby forming an additional surfactant-enriched foam;

iii) separating the surfactant-enriched foam produced in (ii) from the surfactant-depleted liquid formed in (ii);

iv) returning the surfactant in said surfactant-enriched foam to said fibrous web forming process;

b) subjecting the surfactant-depleted liquid to sufficient additional surfactant separation steps to reduce the concentration of surfactant in the surfactant-depleted liquid from substep (iii) of the last surfactant separation step to a level at which it is no longer foamable; and c) returning the additional surfactant-depleted liquid from substep (ii) of the last surfactant separation step to the process in the form of a stream of non-foamable aqueous liquid separate from said surfactant enriched foam.

22. The method of claim 12 comprising the additional steps of:

a) subjecting the surfactant-depleted liquid to at least one additional surfactant separation step, each surfactant separation step comprising the substeps of:

i) forming an additional stable foam from said surfactant-depleted liquid produced in the preceding step by passing air bubbles therethrough;

ii) draining an additional surfactant-depleted liquid from said additional stable foam produced in (i) drainage; thereby forming an additional surfactant-enriched foam;

iii) separating air from the surfactant-depleted liquid produced in (ii);

iv) returning the surfactant in said surfactant-enriched foam to said industrial process;

b) subjecting the surfactant-depleted liquid to sufficient additional surfactant separation steps to reduce the concentration of surfactant in the surfactant-depleted liquid from substep (iii) of the last surfactant separation step to below less than 10 ppm by weight; and c) returning the additional surfactant-depleted liquid from substep (ii) of the last surfactant separation step to the process.

23. The method of claim 12 wherein the surfactant is an alpha olefin sulfonate having at least about 10 carbon atoms.

24. A method of separating a foamed liquid admixture recovered from a fibrous web forming process into a surfactant depleted stream and a surfactant enriched stream and recovering surfactant from said surfactant enriched stream comprising:

draining surfactant-depleted liquid which is substantially free of entrained bubbles from said foamed liquid admixture;

separating the surfactant-enriched foam from the surfactant-depleted liquid;

forming a stable-free-draining foam from said surfactant-depleted liquid by passing a plurality of air bubbles therethrough, wherein substantially all of said bubbles are between about 0.1 and about 10 mm in diameter and said free-draining foam is sufficiently stable to allow a foam residence time of several seconds;

draining a second surfactant-depleted liquid which is substantially free of entrained bubbles from said stable-free-draining foam in the substantial absence of coalescence in said foam, thereby forming a surfactant-enriched foam and a surfactant-depleted underflow;

separating the surfactant-enriched foam from the surfactant-depleted underflow forming a surfactant-enriched stream and a surfactant-depleted stream; and returning said surfactant-enriched stream to said fibrous web forming process in the form of a stream separate from said surfactant depleted stream and having a concentration of surfactant exceeding that of said foamable aqueous admixture.

25. The method of claim 24 wherein prior to returning the surfactant to the process, air is separated from the surfactant-enriched foam by rupturing bubbles contained therein, thereby forming a resolved surfactant-enriched foam.

26. The method of claim 25 wherein said fibrous web forming process is a forming process in which a foamable liquid having a surfactant concentration of at least about 30 ppm by weight is present in a headbox and wherein drainage is allowed to continue until the concentration of surfactant in the resolved surfactant-enriched foam is at least substantially equivalent to the concentration of surfactant in the foamable liquid in said headbox and wherein said bubbles are predominately between about 1 mm in diameter and about 5 mm.

27. The method of claim 26 wherein said foamable aqueous admixture comprises at least about 30 ppm by weight of surfactant, from about 1 percent to about 97 percent of a liquid aqueous phase by volume, and from about 3 percent to about 99 percent of air distributed through said liquid aqueous phase.

28. The method of claim 24 wherein the concentration of the surfactant in the surfactant-enriched foam exceeds about 100 ppm by weight.

29. The method of claim 24 comprising the additional steps of:

a) forming a second stable foam from said surfactant-depleted liquid by passing bubbles of air therethrough;

b) draining a second surfactant-depleted liquid from said second foam; thereby forming a second surfactant-enriched foam;

c) separating said second surfactant-enriched foam from said second surfactant-depleted liquid;

d) returning said second surfactant-enriched foam to said process; and e) returning water contained in said second surfactant-depleted liquid to said process.

30. The method of claim 24 comprising the additional steps of subjecting the surfactant-depleted liquid to at least one additional surfactant separation step, each surfactant separation step comprising the substeps of:

i) forming an additional stable foam from said surfactant-depleted liquid produced in the preceding step by passing air bubbles therethrough;

ii) draining an additional surfactant-depleted liquid from said additional stable foam produced in (i); thereby forming an additional surfactant-enriched foam;

iii) separating the surfactant-enriched foam produced in (ii) from the surfactant-depleted liquid formed in (ii);

iv) returning the surfactant in said surfactant-enriched foam to said fibrous web forming process; and v) returning the additional surfactant-depleted liquid from substep (ii) of the last surfactant separation step to the process.

31. The method of claim 24 comprising the additional steps of:

a) subjecting the surfactant-depleted liquid to at least one additional surfactant separation step, each surfactant separation step comprising the substeps of:

i) forming an additional stable foam from said surfactant-depleted liquid produced in the preceding step by passing air bubbles therethrough;

ii) draining an additional surfactant-depleted liquid from said additional stable foam produced in (i); thereby forming an additional surfactant-enriched foam;

iii) separating air from the surfactant-depleted liquid produced in (ii);

iv) returning the surfactant in said surfactant-enriched foam to said industrial process;

b) subjecting the surfactant-depleted liquid to sufficient additional surfactant separation steps to reduce the concentration of surfactant in the surfactant-depleted liquid from substep (iii) of the last surfactant separation step to below less than 10 ppm by weight, and c) discharging the additional surfactant-depleted liquid from substep (ii) of the last surfactant separation step to the environment in the form of an ecologically acceptable aqueous discharge stream comprising less than 10 ppm by weight of said surfactant.

32. The method of claim 29 wherein at least 50% by volume of said air bubbles are between about 1 mm and 5 mm in size.

33. The method of claims 29 wherein at least 50% by number of said air bubbles are between about 1 mm and about 5 mm in size.

34. The method of claim 24 wherein the surfactant is an alpha olefin sulfonate having at least about 10 carbon atoms.

35. A method of separating a foamed aqueous admixture discharged from a fibrous web forming process into a first stream comprising non-foamable water surfactant admixture and a second stream comprising an enriched aqueous admixture of surfactant and aqueous liquid, the concentration of surfactant in said first stream being less than about half the concentration of surfactant in said foamed aqueous admixture, comprising the steps of:

draining surfactant-depleted liquid which is substantially free of entrained bubbles from said foamed liquid admixture, thereby forming a surfactant-enriched foam;

separating the surfactant-enriched foam from the surfactant-depleted liquid;

providing the surfactant-depleted liquid as a foamable aqueous admixture feed stream to an aqueous purification step comprising the substeps of:

forming a free-draining-stable foam from said feed stream by passing air bubbles therethrough, wherein substantially all of said bubbles are between about 0.1 and about 10 mm in diameter and said free-draining foam is sufficiently stable to allow a foam residence time of several seconds;

separating surfactant-depleted aqueous liquid stream which is substantially free of entrained bubbles from said stable-free-draining foam by drainage without substantial coalescence of said stable-free-draining foam, thereby forming a second surfactant-enriched foam, the concentration of surfactant in said surfactant-depleted liquid stream being less than about half the concentration of surfactant in said foamable aqueous admixture;

separating the second surfactant-enriched foam from the second surfactant-depleted aqueous liquid stream, thereby forming a surfactant-enriched overflow from the surfactant-enriched foam and a purified aqueous underflow from the surfactant-depleted aqueous liquid; and returning the purified aqueous underflow to said fibrous web forming process in the form of a stream having a concentration of surfactant less than half of the concentration of surfactant in said foamed aqueous admixture discharged from said fibrous web forming process.

36. The method of claim 35 wherein the surfactant in the surfactant-enriched foam produced in each aqueous purification step is returned to the fibrous web forming process in a stream which is separate from said purified aqueous underflow and wherein said bubbles are predominately between about 1 mm in diameter and about 5 mm.

37. The method of claim 36 wherein prior to returning the surfactant to the process, air is separated from the surfactant-enriched foam by rupturing bubbles contained therein, thereby forming a resolved surfactant-enriched foam.

38. The method of claim 36 wherein said fibrous web forming process is a forming process in which a foamable liquid having a surfactant concentration of at least about 30 ppm by weight is present in a headbox and wherein drainage is allowed to continue until the concentration of surfactant in the resolved surfactant-enriched foam is at least substantially equivalent to the concentration of surfactant in the foamable liquid in said headbox.

39. The method of claim 35 wherein said foamed aqueous admixture comprises at least about 30 ppm by weight of surfactant, from about 1 percent to about 97 percent of a liquid aqueous phase by volume, and from about 3 percent to about 99 percent of air distributed through said liquid aqueous phase.

40. The method of claim 35 wherein the concentration of the surfactant in the surfactant-enriched foam exceeds about 100 ppm by weight.

41. The method of claim 35 comprising the additional steps of:

a) forming a second stable foam from said surfactant-depleted liquid by passing bubbles of air therethrough;

b) draining a second surfactant-depleted liquid from said second foam; thereby forming a second surfactant-enriched foam;

c) separating said second surfactant-enriched foam from said second surfactant-depleted liquid;

d) returning second surfactant-enriched foam to said process; and e) returning said second surfactant-depleted liquid to said process.

42. The method of claim 35 comprising the additional steps of:

a) subjecting the surfactant-depleted liquid to at least one additional surfactant separation step, each surfactant separation step comprising the substeps of:

i) forming an additional stable foam from said surfactant-depleted liquid produced in the preceding step by passing air bubbles therethrough;

ii) draining an additional surfactant-depleted liquid from said additional stable foam produced in (i); thereby forming an additional surfactant-enriched foam;

iii) separating the surfactant-enriched foam produced in (ii) from the surfactant-depleted liquid formed in (ii);

iv) returning the surfactant in said surfactant-enriched foam to said fibrous web forming process;

b) subjecting the surfactant-depleted liquid to sufficient additional surfactant separation steps to reduce the concentration of surfactant in the surfactant-depleted liquid from substep (iii) of the last surfactant separation step to a level at which it is no longer foamable; and c) returning the additional surfactant-depleted liquid from substep (ii) of the last surfactant separation step to the process.

43. The method of claim 33 comprising the additional steps of:

a) subjecting the surfactant-depleted liquid to additional surfactant separation steps, each surfactant separation step comprising the substeps of:

i) forming an additional stable foam from said surfactant-depleted liquid produced in the preceding step by passing air bubbles therethrough;

ii) draining an additional surfactant-depleted liquid from said additional stable foam produced in (i) drainage; thereby forming an additional surfactant-enriched foam;

iii) separating air from the surfactant-enriched foam produced, in (ii);

iv) returning the surfactant in said surfactant-enriched foam to said industrial process;

b) subjecting the surfactant-depleted liquid to sufficient additional surfactant separation steps to reduce the concentration of surfactant in the surfactant-depleted liquid from substep (iii) of the last surfactant separation step to a level at which it is no longer foamable; and c) returning the additional surfactant-depleted liquid from substep (ii) of the last surfactant separation step to the process in the form of stream comprising less than 10 ppm by weight of said surfactant.

44. The method of claim 41 wherein at least 50% by volume of said air bubbles are between about 1 mm and 5 mm in size.

45. The method of claim 41 wherein at least 50% by number of said air bubbles are between about 1 mm and about 5 mm in size.

46. The method of claim 35 wherein the surfactant is an alpha olefin sulfonate having at least about 10 carbon atoms.

* * * * *